(12) United States Patent
Echigo et al.

(10) Patent No.: US 6,475,571 B1
(45) Date of Patent: Nov. 5, 2002

(54) METHOD OF PRODUCING THIN RESIN FILMS

(75) Inventors: Noriyasu Echigo, Hyogo (JP); Kazuyoshi Honda, Osaka (JP); Masaru Odagiri, Hyogo (JP); Nobuki Sunagare, Shimane (JP); Toru Miyake, Shimane (JP); Tomonori Sato, Shimane (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/830,538
(22) PCT Filed: Oct. 27, 1999
(86) PCT No.: PCT/JP99/05951
§ 371 (c)(1), (2), (4) Date: Jul. 6, 2001
(87) PCT Pub. No.: WO00/24558
PCT Pub. Date: May 4, 2000

(30) Foreign Application Priority Data

Oct. 28, 1998 (JP) .......................................... 10-306636

(51) Int. Cl.[7] .................................................. B05D 1/04
(52) U.S. Cl. .................... 427/458; 427/255.3; 427/256; 427/294; 427/314; 427/322; 427/346; 427/385.5; 427/421; 427/425; 427/475; 427/509; 427/510; 427/533; 427/553; 427/555; 427/558; 427/559; 427/580; 427/595
(58) Field of Search .............................. 427/458, 225.3, 427/256, 294, 314, 322, 346, 385.5, 421, 425, 475, 509, 510, 533, 553, 555, 558, 559, 580, 595

(56) References Cited

U.S. PATENT DOCUMENTS

| | | | |
|---|---|---|---|
| 4,842,893 A | 6/1989 | Yializis et al. |
| 4,954,371 A | 9/1990 | Yializis |
| 5,138,520 A | 8/1992 | Mc Millan et al. |
| 5,372,754 A | 12/1994 | Ono |
| 5,595,603 A | 1/1997 | Klinedinst et al. |

FOREIGN PATENT DOCUMENTS

| | | |
|---|---|---|
| EP | 340 935 | 11/1989 |
| EP | 808 667 | 11/1997 |
| EP | 938 971 | 9/1999 |
| WO | WO 89/07667 | 8/1989 |

Primary Examiner—Bernard Pianalto
(74) Attorney, Agent, or Firm—Merchant & Gould P.C.

(57) ABSTRACT

A method for manufacturing a resin thin film of the present invention includes supplying a liquid resin material and a gas to a two-fluid nozzle by pressure; ejecting the resin material in the form of atomized particles toward a heating member by the two-fluid nozzle, thereby adhering the resin material to the heating member; or mixing a liquid resin material with a gas; ejecting the resin material in form of atomized particles toward a heating member that is provided under reduced pressure, thereby adhering the resin material to the heating member; and evaporating the resin material on the heating member to obtain the evaporated resin material. Thus, the present invention can provide a resin thin film having a uniform thickness stably with simple means at a low cost. The resin thin film obtained by the present invention can be used in a wide range, for example a magnetic recording medium such as a magnetic tape, a wrapping material, and an electronic component.

50 Claims, 9 Drawing Sheets

METHOD OF PRODUCING THIN RESIN FILMS

TECHNICAL FIELD

The present invention relates to a method for manufacturing a resin thin film, in particular, a method for forming a resin thin film on a supporting base by evaporating a resin material so that the resin material is deposited on a surface of the supporting base.

BACKGROUND ART

Thin films play an important part in a wide range of aspects of current society and are utilized in a variety of areas in our daily life such as wrapping papers, magnetic tapes, capacitors, semiconductors or the like. The basic trends of technology including high performance and miniaturization in recent years cannot be discussed without referring to such thin films. At the same time, various methods for forming a thin film have been under development to satisfy industrial demands. For example, continuous winding vacuum evaporation, which is advantageous to high-speed mass production, has been performed to form the thin films for use in wrapping papers, magnetic tapes, capacitors or the like. In this case, a thin film having desired characteristics can be formed by selecting an evaporation material and a substrate material to meet the purpose of the thin film to be formed and introducing a reactive gas in a vacuum chamber, if necessary, or forming the thin film while applying an electric potential to the substrate.

A method for forming a resin thin film by coating a supporting base with a resin material that is diluted with a solvent is known as a method for obtaining a resin thin film. Reverse coating or die coating is used industrially, and generally the material is dried and cured after coating. The thickness of coating by a common coating technique is several $\mu$m or more immediately after coating. Therefore, the material is required to be diluted with a solvent to form a very thin resin film. Nevertheless, the lower limit of the thickness of the resin thin film formed by these methods is often around 1 $\mu$m, although it may be varied depending on the material used. It is often difficult to obtain a thickness less than 1 $\mu$m. Furthermore, the solvent dilution is not preferable, because the dilution with a solvent causes defects readily in a coating film after drying due to the evaporation of the solvent, as well as in view of environmental protection. Therefore, a method for forming a resin thin film without the solvent dilution and a method by which a very thin resin film can be obtained stably are in demand.

As a method to solve this problem, a method for forming a resin thin film in a vacuum has been proposed. For example, EP 0 808 667 discloses the following method. A resin material is supplied to a heating member so as to be heated and evaporated in a vacuum. Then, the resin material is deposited on a moving supporting base so that a resin thin film is formed on the supporting base continuously. This method permits the resin thin film to be formed without void defects and the solvent dilution to be eliminated.

However, in the method disclosed in EP 0 808 667, the amount of the resin material evaporated is not stable, so that the obtained resin thin film cannot have a uniform thickness. In addition, the properties of the obtained resin thin film are not stable, or a resin thin film having desired properties cannot be obtained. In particular, the demand for the characteristics of the resin thin film that is to be used in electronic components have become increasingly high. The problems as described above reduce the yield of the products and increase the cost.

The inventors of the present invention studied to solve the problems in the conventional method for manufacturing a thin film. As a result, they found out that these problems were caused by the manner in which the resin material is supplied to a heating member.

More specifically, conventionally, the resin material is supplied to a heating member after the resin material is atomized with an ultrasonic transducer, a spray nozzle, or a mechanical atomizer.

However, in atomization with an ultrasonic transducer, it is difficult to atomize the resin material stably for a long time. Moreover, the resin material is heated by a mechanical external force applied to the resin material during the process of atomization, so that the nature of the resin material may be changed or the resin material may be solidified before being atomized. When the nature of the resin material has been changed, not only is the amount of the resin material evaporated not stabilized, but also a resin thin film having desired properties cannot be obtained. Furthermore, expensive equipment is required so that a cost-efficient resin thin film cannot be obtained.

Atomization with a spray nozzle is not suitable for a resin material having a large viscosity, so that the range of usable resin materials is limited. Moreover, since the particle size of the atomized resin material is relatively large, it is difficult to atomize the resin material stably when the amount of the resin material supplied is small, Therefore, it is difficult to form a resin thin film having a small thickness stably.

Furthermore, in atomization with a mechanical atomizer, an external force applied to the resin material for atomization is large, and therefore the resin material is heated. As a result, the nature of the resin material is changed or the resin material is solidified before being atomized. Furthermore, as in the case of the spray nozzle, since the particle size of the obtained resin material is relatively large, it is difficult to form a resin thin film having a small thickness stably.

DISCLOSURE OF INVENTION

It is an object of the present invention to provide a method for manufacturing a resin thin film that can solve the above problems and manufacture a resin thin film having a uniform thickness stably with simple apparatus at a low cost, by using a new method for supplying a resin material that can be substituted for the conventional supply method.

The present invention can have the following embodiments to achieve the above object.

A method for manufacturing a resin thin film according to a first embodiment of the present invention is a method for manufacturing a resin thin film by depositing an evaporated resin material on a surface of a supporting base. The method includes supplying a liquid resin material and a gas to a two-fluid nozzle by pressure; ejecting the resin material in the form of atomized particles toward a heating member by the two-fluid nozzle, thereby adhering the resin material to the heating member; and evaporating the resin material on the heating member to obtain the evaporated resin material.

A method for manufacturing a resin thin film according to a second embodiment of the present invention is a method for manufacturing a resin thin film by depositing an evaporated resin material on a surface of a supporting base. The method includes mixing a liquid resin material with a gas; ejecting the resin material in the form of atomized particles toward a heating member that is provided under a reduced pressure, thereby adhering the resin material to the heating member; and evaporating the resin material on the heating member to obtain the evaporated resin material.

According to the first and second embodiments of the present invention, the liquid resin material is ejected to a heating member by a two fluid nozzle or is ejected to a heating member that is provided under a reduced pressure after being mixed with a gas, so that the resin material in the form of atomized particles adheres to the heating member. Therefore, a mechanical external force that can affect the resin material in the process of atomization can be small, and therefore heat generation can be suppressed. As a result, the nature of the resin material can be prevented from changing, so that a resin thin film having desired properties can be obtained. Moreover, since the heat generation is small, the resin material is not solidified before being atomized. As a result, a resin thin film having a uniform thickness can be obtained stably. In addition, since the size of the obtained atomized particles is small, the amount of the resin material adhered to the heating member can be stabilized. As a result, the present invention can be used to manufacture a resin thin film having a very small thickness. In addition, since the range of usable resin materials is wide, a wide range of resin thin films having required properties can be manufactured by changing the resin material as appropriate. In addition, since the equipment for atomization is simple, a resin thin film can be manufactured at low cost.

BEST MODE FOR CARRYING OUT THE INVENTION

Hereinafter, the present invention will be described with reference to the accompanying drawings more specifically.

Embodiment 1

Figure 1:
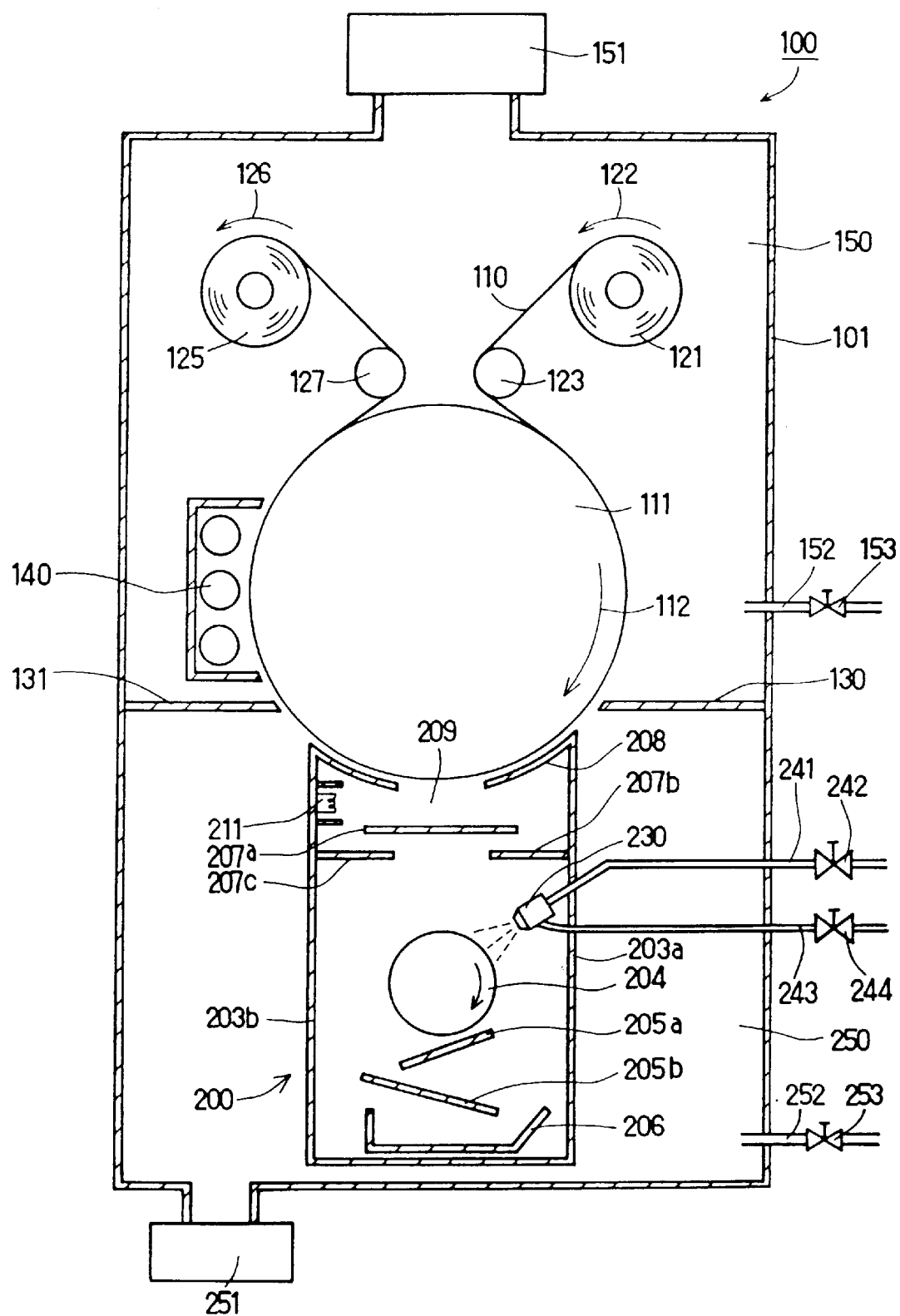
FIG. 1 is a cross-sectional drawing schematically showing an internal structure of an example of an apparatus used in a method for manufacturing a resin thin film according to Embodiment 1 of the present invention.

FIG. 1 is a cross-sectional drawing schematically showing an internal structure of an example of an apparatus for manufacturing a resin thin film for performing the present invention.

A belt-shaped supporting base 110 on which a resin thin film is formed is unwound from an unwinding roll 121 that rotates in a rotation direction 122, and passes along a guide roll 123, travels along a cylindrical can roller 111 that rotates in a rotation direction 112. Then, the supporting base 110 passes along a guide roll 127 and wound by a winding roll 125 that rotates in a rotation direction 126. As the belt-shaped supporting base 110, a long resin film on which an Al evaporated film is formed can be used. The can roller 111 is cooled to, preferably —20° C. to 40° C., more preferably, —10° C. to 10° C.

The main components of the apparatus 100 for manufacturing a resin thin film are housed in a vacuum container 101. The vacuum container is partitioned substantially into two compartments by partition walls 130 and 131. The upper compartment 150 (a second compartment) including the unwinding roll 121 and the winding roll 125 is maintained at about $5 \times 10^{-4}$ Torr by a vacuum pump 151. The lower compartment 250 (a first compartment) including an apparatus 200 for forming a resin thin film (hereinafter, referred to as "resin thin film forming apparatus") is maintained at about $2 \times 10^{-4}$ Torr by another vacuum pump 251. Thus, the pressure in the lower compartment 250 (the first compartment) is lower than that of the upper compartment 150 (the second compartment). This design prevents the vapor of the resin from entering the upper compartment. As a result, the amount of the resin material adhered to the transporting system of the supporting base can be reduced, so that the frequency of maintenance can be small.

A resin material to be formed into a resin thin film on the supporting base 110 is heated in the resin thin film forming apparatus 200 provided under the can roller 111 so as to be evaporated. Since the pressure in the lower compartment 250 that is outside the resin thin film forming apparatus 200 is lower than that in the resin thin film forming apparatus 200, the evaporated resin material is released through an opening 209 provided in an opening plate 208. Since the opening 209 is provided opposed to the circumferential surface of the can roller 111, the released resin material is deposited on the travelling supporting base 110, and solidified so as to form a resin thin film.

The formed resin thin film is cured to a desired curing degree by an ultraviolet ray irradiation device 140, if necessary, and then wound by the winding roll 125.

The resin material is evaporated in the following manner.

A liquid resin material is supplied to a two-fluid nozzle 230 in the resin thin film forming apparatus 200 through a tube 241 for supplying a resin material (hereinafter, referred to as "resin material supply tube") at a predetermined flow rate adjusted by a valve 242 for adjusting a flow rate. A gas is supplied to the two-fluid nozzle 230 through a tube 243 for supplying a gas (hereinafter, referred to as "gas supply tube") at a predetermined gas flow rate adjusted by a valve 244 for adjusting a gas flow rate. The resin material is ejected in the form of atomized particles together with the gas from an outlet of the two-fluid nozzle toward a heating roll 204, which rotates in the direction shown by the arrow. The structure of the two-fluid nozzle 230 is not limited to a particular structure, and can be selected as appropriate, depending on the properties of the resin material used (e.g., viscosity), the amount of the resin material ejected, or the shape of the heating member.

Figure 2:
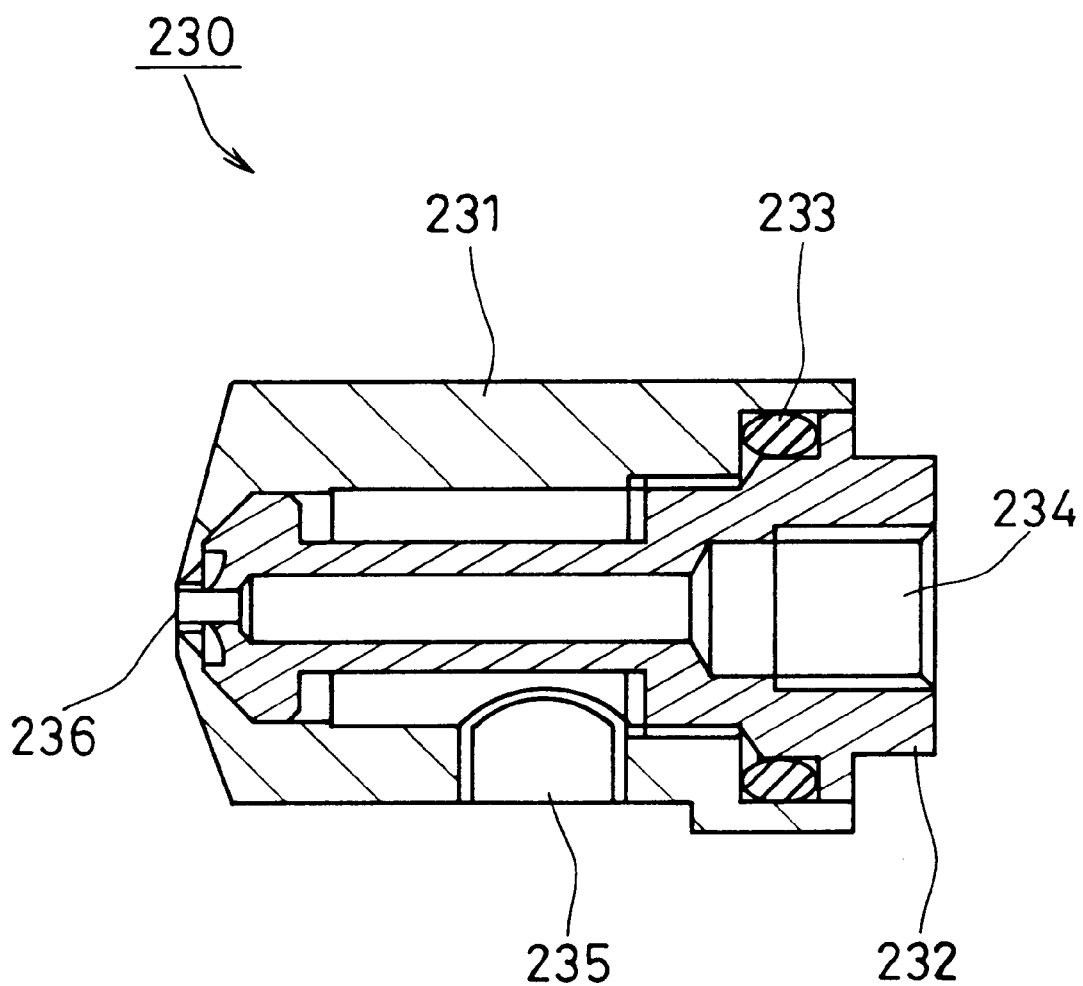
FIG. 2 is a cross-sectional drawing schematically showing the structure of an example of a two-fluid nozzle according to Embodiment 1 of the present invention.

FIG. 2 is a cross-sectional drawing schematically showing the structure of an example of the two-fluid nozzle 230 that can be used in this embodiment.

The two-fluid nozzle in FIG. 2 includes an outer cylinder 231, an inner cylinder 232 engaged in the outer cylinder, and an O-ring 233 for sealing the outer cylinder 231 and the inner cylinder 232. A port 234 for supplying a resin material is formed on one end face of the inner tube 232, and the resin material supply tube 241 is connected thereto so as to supply the liquid resin material. On the other hand, a port 235 for supplying a gas is formed on the side of the outer cylinder 231, and the gas supply tube 243 is connected thereto so as to introduce a gas. Thus, the resin material is atomized by the gas and ejected from an outlet 236. For simplification, in FIG. 2, the shape of the outlets of the resin and the gas is a round shape. However, in the case where the resin is sprayed to the heating roll 204, as shown in FIG. 1, it is desirable that the shape of resin being sprayed is a fan-shape contained in a plane perpendicular to the sheet of the FIG. 1. This is because uniform attachment of the resin to the heating roll 204 in the longitudinal direction (the direction perpendicular to the sheet of FIG. 1) results in more stable evaporation of the resin. For this reason, it is desirable that the resin outlet and the gas outlet of the two-fluid nozzle are parallel slits. Moreover, the two-fluid nozzle is arranged so that these slits face the heating roll 204 in parallel to the longitudinal direction of the heating roll 204.

A preferable gas to be used is an inert gas, for example a gas containing at least one selected from the group consisting of nitrogen, oxygen, argon, helium and neon. Among these, nitrogen is most preferable, because it is inexpensive and it makes it easy to adjust the curing degree of the resin thin film, when oxygen is contained.

Figure 3:
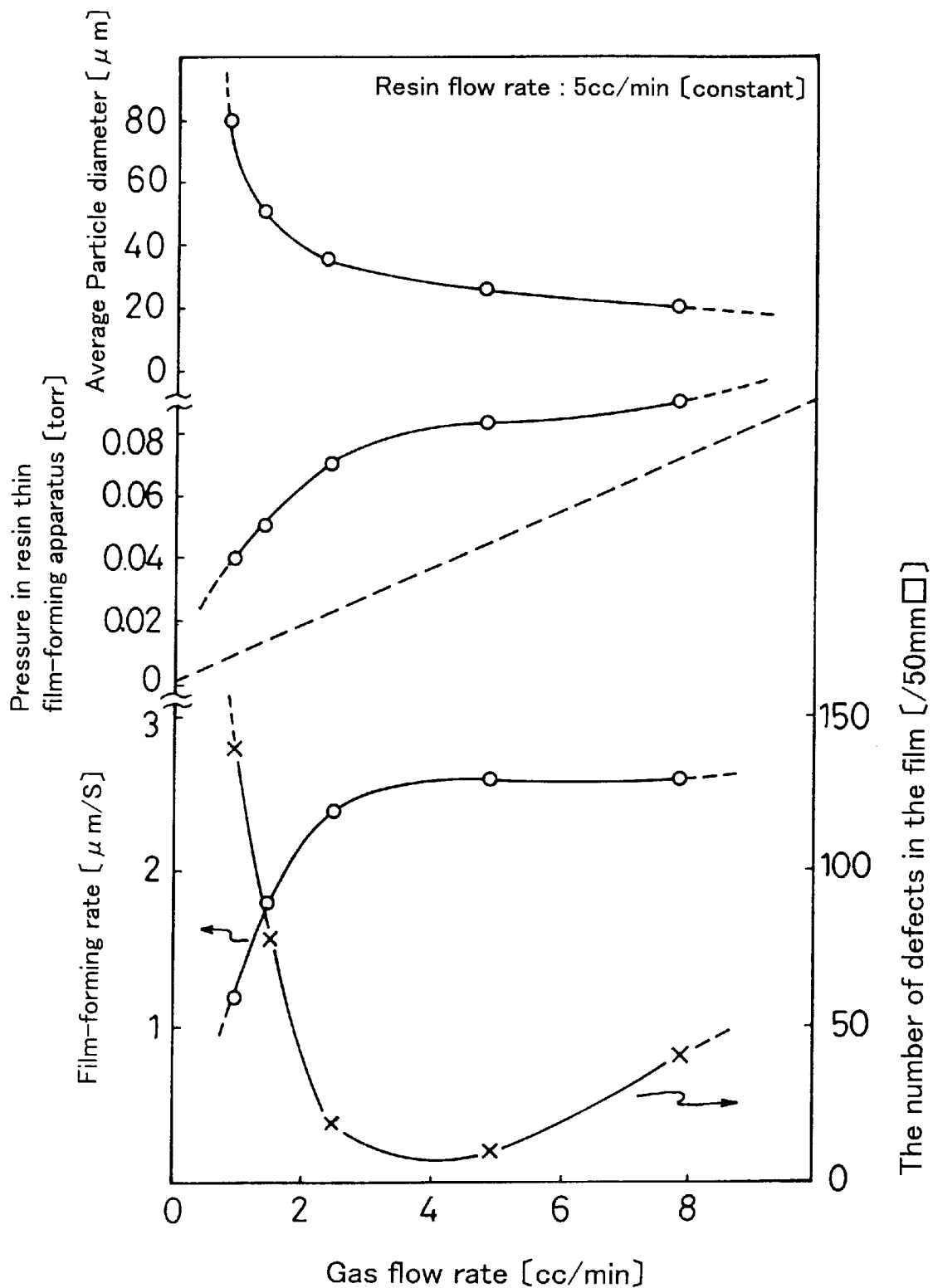
FIG. 3 is a graph showing an example of relationship between the flow rate of a gas, the average particle diameter of a resin sprayed from the two-fluid nozzle, the pressure in an apparatus for forming a resin thin film, the film-forming rate, and the number of defects contained in the resin thin film, when the two-fluid nozzle of Embodiment 1 of the present invention is used.

The pressure and the flow rate of the gas used are required to be adjusted as appropriate, depending on the viscosity of the resin material used or the amount of the resin material supplied. FIG. 3 is a graph showing an example of the dependence of the average particle diameter of the resin sprayed from the two-fluid nozzle, the pressure in the resin thin film forming apparatus 200, the film-forming rate, and the number of defects contained in the resin thin film with respect to the gas flow rate, when the same two-fluid nozzle is used and the flow rate (5 cc/min) and the pressure of the resin are constant.

The average particle diameter of the resin sprayed from the two-fluid nozzle decreases as the gas flow rate increases. However, the extent of the decrease is sharp in a region where the gas flow rate is small, and thereafter the extent of the decrease gradually becomes smaller as the gas flow rate increases.

The pressure in the resin thin film forming apparatus 200 with respect to the gas flow rate increases significantly in a region where the average particle diameter of the sprayed resin drops sharply. This is because the surface area of the sprayed resin becomes larger as the average particle diameter becomes smaller, so that the evaporation efficiency becomes high. However, in a region where the gas flow rate is substantially the same as that of the resin (5 cc/min) or more, the pressure in the resin thin film forming apparatus 200 tends to be saturated, and thereafter increases substantially in proportion to the gas flow rate.

Corresponding thereto, the film forming rate increases in a region of the gas flow rate where the pressure in the resin thin film forming apparatus 200 increases sharply. When the average particle diameter of the introduced resin becomes a certain value or less (40 $\mu$m or less in FIG. 3), 100% of the introduced resin is evaporated, so that the film forming rate is substantially constant.

On the other hand, the number of defects contained in the resin thin film decreases sharply as the average particle diameter of the sprayed resin decreases. The reason for this is as follows. When the average particle diameter is large, the resin cannot adhere uniformly onto the heating roll 204. In addition, the thickness of the resin material becomes large, so that the convection in the liquid film is not sufficiently effected so that the entire liquid film cannot be heated uniformly. Consequently, bumping of the resin material occurs (herein, "bumping" indicates the phenomenon where the resin material is heated rapidly so as to be boiled so that liquid drops of the resin material are scattered), thus resulting in a large number of large particles reaching the supporting base 110. However, when the gas flow rate increases further, the number of defects in the film becomes very small, and thereafter increases again. This is because although less bumping of the resin material occurs, the gas is taken into the film and causes defects.

As seen from FIG. 3, when the resin flow rate is constant, an optimal region of the gas flow rate exists in view of the film forming rate and the number of defects in the film. FIG. 3 shows the case of the resin having a viscosity of 50 to 150 CPS. In this case, when the gas is introduced to the two-fluid nozzle at a flow rate of 40 to 100% of the resin flow rate, a resin thin film having good productivity and good quality can be obtained. In general, when the viscosity of the resin is high, it is necessary to increase the gas flow rate relatively. In the highest case, 200% of the resin flow rate may be required as the gas flow rate. On the other hand, in the case where the viscosity of the resin is less than 50 CPS, the gas flow rate can be relatively small, and in the lowest case, the gas flow rate can be about 10% of the resin flow rate.

The resin material ejected from the two-fluid nozzle 230 in the form of atomized particles adheres to an area of some extent on the heating roll 204, which rotates in the direction shown by the arrow in FIG. 1. The adhered resin material in the form of a large number of fine liquid droplets evaporates on the surface of the heating roll 204. Alternatively, the adhered resin material spreads over the surface of the heating roll 204 to form a thin liquid film of the fine liquid droplets being linked, and a part thereof evaporates. In the present invention, the resin material is adhered to the heating roll 204 in the form of very fine atomized particles having a relatively uniform particle diameter. This embodiment allows the formed liquid film to have a very small and uniform thickness. As a result, the amount of the resin material evaporated can be stabilized. When the particle diameter of the particles adhered to the heating roll 204 is large, or when the particle diameter is not uniform, the thickness of the formed liquid film also is large and non-uniform. Therefore, the convection in the liquid film is not sufficiently effected so that the entire liquid film is not uniformly heated. Consequently, only the resin material in the very vicinity of the surface of the heating roll 204 is heated rapidly, and the resin material in that portion is cured by the heat. As a result, it is unlikely to obtain a resin thin film having a uniform thickness. Moreover, the bumping of the resin material occurs so that a large number of large particles are scattered. Then, large protrusions or the like are formed on the surface of the formed resin thin film, thus deteriorating the smoothness of the surface and increasing defects in the resin thin film.

It is desirable that the resin material adhered to the heating roll 204 has evaporated during one rotation of the heating roll 204, but cannot evaporate in some cases, depending on various conditions such as the amount of the resin material supplied or the type of the resin material. In such a case, as shown in FIG. 1, it is desirable to provide a first heating plate 205a and a second heating plate 205b under the heating roll 204. In this design, the resin material that has not been evaporated on the heating roll 204 and reached the lowest portion drops onto the first heating plate 205a and moves thereon, and further drops onto the second heating plate 205b. This resin material spreads in the form of a liquid film while moving on these heating plates, so that a part thereof evaporates.

As described above, when the liquid resin material is allowed to move along the heating member, the resin material can be heated while being spread in the form of a thin film, so that the resin material can be heated uniformly. Thus, the amount of the resin material evaporated can be increased and stabilized. If the resin material is allowed to stay in a limited area and heated without allowing to move, the convection in the resin material is poor and the resin material is not heated uniformly, so that the resin material in the vicinity of the surface of the heating plates is thermally cured or the bumping occurs, so that a large number of large particles are scattered. As a result, not only is the amount of the resin material evaporated small, but also the non-uniformity of the thickness of the formed resin thin film becomes worse, and the smoothness of the surface deteriorates due to the large protrusions.

The resin material that has not been evaporated ultimately drops in a cooling cup 206 provided thereunder, and the process of evaporation ends.

The heating member is not limited to the combination of the heating roll 204 and the heating plates 205a and 205b shown in FIG. 1. The heating roll alone, which rotates as described above, can be used. Alternatively, one or a plurality of inclined heating plates alone can be used. Furthermore, a solid cone heater or a cone-shaped heating plate can be used. In this case, when the shape formed by the atomized particles of the resin sprayed from the two-fluid nozzle is an approximately solid cone-shape or hollow cone-shape, and the resin material is sprayed from a point substantially on the central axis of the cone surface of the heating member and positioned for a predetermined distance away from the apex, the resin material can be adhered substantially uniformly on the cone surface. Consequently, the evaporation of the resin material can be stabilized. Alternatively, instead of the heating roll, a rotating endless belt that has been heated can be used. A flat plate is advantageous in that the structure can be simplified, and the rotating roll or belt is advantageous in that the position where the resin material is supplied can be changed over time, so that the equipment can be small and the temperature of the heating member can be controlled easily.

The liquid resin material preferably is supplied to the heating member after being preheated. Preheating reduces the difference in temperature between the resin material and the heating member and reduces the bumping of the resin material. Furthermore, the difference in temperature in a liquid droplet or a liquid film of the resin material on the heating member can be relatively small, and the resin material can be heated substantially uniformly. This prevents the resin material in the vicinity of the heating member from being heated rapidly and cured by heat. As a result, a resin thin film having a smooth surface and no large protrusions can be obtained stably.

The resin material that has been evaporated by the heating roll 204 and the heating plates 205a and 205b moves toward the opening 209 by the difference in atmospheric pressure between the inside and the outside of the resin thin film forming apparatus 200. In this case, the resin material passes between barriers 207a and 207b or between barriers 207a and 207c, and between the barrier 207a and the opening plate 208.

The barriers 207a and 207b, the barriers 207a and 207c, the barrier 207a and the opening plate 208 are provided in the following manner. The members of each pair are spaced apart by a predetermined distance, and a part of one member can be opposed to a part of the other member, namely, the members of each pair can have an overlapped portion. The spacing between barriers can be adjusted in accordance with the thickness of the resin thin film to be formed. In the case where the thickness is small, the spacing can be small, and in the case where the thickness is large, the spacing can be large. When the resin material passes between such barriers, variations over time in the amount of the resin material evaporated can be absorbed and the amount of the adhered resin material can be stabilized. Furthermore, since the vapors of the resin material are diffused uniformly in the width direction of the supporting base, a resin thin film having a uniform thickness in the width direction can be obtained.

However, the arrangement of the barriers is not limited to that shown in FIG. 1, and can be changed as appropriate. For example, the distance between the opposing barriers, the size of the opposing portions (overlapped portion), the number of the barriers can be changed as appropriate, depending on the type of the resin material or the evaporation conditions or the like. Furthermore, the barriers may be curved plates instead of flat plates.

Furthermore, preferably, the apparatus is designed such that the region where the resin material is ejected from the two-fluid nozzle 230 in the form of atomized particles is not in straight communication with the region of the supporting base where the resin material is deposited (the opening 209).

In addition, preferably, the apparatus is designed such that the regions of the heating roll 204 and the heating plates 205a and 205b where the resin material is evaporated are not in straight communication with the region of the supporting base where the resin material is deposited (the opening 209).

These designs can prevent the atomized resin material or the particles scattered from the heating member as a result of bumping from adhering to the supporting base 110. As a result, defects on the resin thin film such as large protrusions can be prevented so that the resin thin film can have a smooth surface. In the apparatus of FIG. 1, the barriers 207a, 207b and 207c and the opening 209 are advantageously provided so as to obtain the above-described designs. However, the present invention is not limited thereto. For example, the resin thin film forming apparatus 200 itself is formed so as to have a hook structure so that the sprayed or evaporated resin materials cannot pass straight to the supporting base.

Furthermore, circumferential walls 203a and 203b, the barriers 207a, 207b and 207c and the opening plate 208 can be heated to evaporate the resin material that adheres thereto again and to prevent the surfaces thereof from being contaminated.

The evaporated resin material can be charged before adhering to the supporting base 110. In the apparatus of FIG. 1, a device 211 for irradiating a charged particle beam is provided so as to be directed toward a region where the resin material passes by. The charged resin particles are accelerated by electrostatic attraction, and due to the microscopic electrostatic repulsion during the deposition, they avoid the portions where charged particles already were deposited. Due to this mechanism, a very smooth resin thin film can be formed. This is effective especially when a resin material having a large viscosity is used to form a resin thin film having a smooth surface. Instead of charging gaseous particles of the resin material, charging the surface of the supporting base 110 before the resin material is deposited thereon provides the same effects.

As the device 211 for irradiating charged particle beam, any means can be used as long as it can charge the resin material particles or the deposition surface. For example, an electron beam irradiation device, an ion source that irradiates an ion beam, a plasma source or the like can be used The thus formed resin thin film on the supporting base 110 is cured to a desired curing degree by a resin curing device 140, if necessary. Examples of the curing methods include electron beam irradiation, curing by heat or the like, in addition to the method using ultraviolet ray irradiation shown in FIG. 1.

The curing method can be selected as appropriate, depending on the resin material used. However, among preferable methods is a method in which the resin material is cured by polymerization and/or crosslinking.

The extent of the curing treatment can be changed as appropriate, depending on the use or required characteristics of the resin thin film to be manufactured. For example, when a resin thin film for use in an electronic component such as a capacitor is to be manufactured, the curing treatment is performed preferably until the curing degree reaches 50 to 95%, more preferably 50 to 75%. When the curing degree is smaller than the above described ranges, the resin material can be deformed easily by an external force or the like in the processes where the resin thin film obtained in the method of the present invention is pressed, or an electronic component including the resin thin film is mounted in a circuit substrate. In addition, metal thin films as electrodes formed on the resin thin film by vapor deposition or the like can be ruptured or short-circuited. On the other hand, when the curing degree is larger than the above-described ranges, the resin thin film may be cracked while the supporting base 110 on which the resin thin film is formed is transported or wound, or during the subsequent processes. To determine the curing degree of the present invention, the ratio of the absorbance of the C=O groups and the C=C groups (1600 cm$^{-1}$) is determined with an infrared spectrophotometer, the ratio of each monomer and the cured product is determined, and the curing degree is defined as 1 minus the reduced absorption ratio.

In the process for forming a resin thin film, the vacuum degrees of the upper compartment 150 (the second compartment) and the lower compartment 250 (the first compartment) of the vacuum container are changed by various factors. For example, the vacuum degree can be changed by excessive suction of the vacuum pumps 151 and 251, reduction of the vacuum degree due to dispersion of the resin material, or reduction of the vacuum degree due to a gas supplied from the gas supply tube 243. When the vacuum degree of the lower compartment 250 is changed, the amount of the gaseous resin material that passes through the opening 209 is changed. As a result, the deposition thickness of the formed resin thin film is changed over time. Furthermore, when the difference in atmospheric pressure between the upper compartment 150 and the lower compartment 250 is changed, and the pressure in the upper compartment 150 becomes lower than that in the lower compartment 250, the vapor of the resin material enters the upper compartment, so that the resin material adheres to various sliding portions, requiring cleaning operations, which prevents a continuous operation for a long time.

As means for maintaining the vacuum degrees of the upper compartment 150 and the lower compartment 250 and the difference thereof between them, in the apparatus of FIG. 1, the upper compartment 150 and the lower compartment 250 includes the vacuum pumps 151 and 251 and gas inlet tubes 152 and 252 for introducing a gas therein, respectively. The gas inlet tubes 152 and 252 are provided with valves 153 and 253 for adjusting a flow rate so that the amount of the gas introduced can be adjusted.

In the present invention, the resin thin film material is not limited thereto, and any material can be used as long as it can form a thin film by being evaporated and deposited, and selected as appropriate depending on the use of the resin thin film. However, a reactive monomer resin is preferable. For example, for the resin thin film to be used as an electronic component material, a material comprising an acrylate resin or a vinyl resin as a main component is preferable. More specifically, polyfunctional (meth)acrylate monomer or a polyfunctional vinyl ether monomer are preferable. In particular, cyclopentadiene dimethanol diacrylate, cyclohexane dimethanol divinyl ether monomer or monomers whose hydrocarbon groups are substituted are preferable. The resin thin films formed of these materials have excellent electrical characteristics, heat resistance and stability.

The supporting base on which the resin thin film is formed is not limited to the belt-shaped resin film where Al is vapor-deposited as in this embodiment. For example, the vapor deposition on the surface is not necessarily performed. In addition, a metal thin film can be formed by known methods other than the vapor deposition, such as sputtering, ion plating and metal plating. Furthermore, the metal thin film is not limited to Al, and other various metals can be used. Furthermore, instead of the belt-shaped supporting base, the supporting base may be in the form of a rotating cylindrical drum, an endless belt, a revolving disk or the like.

Embodiment 2

Figure 4:
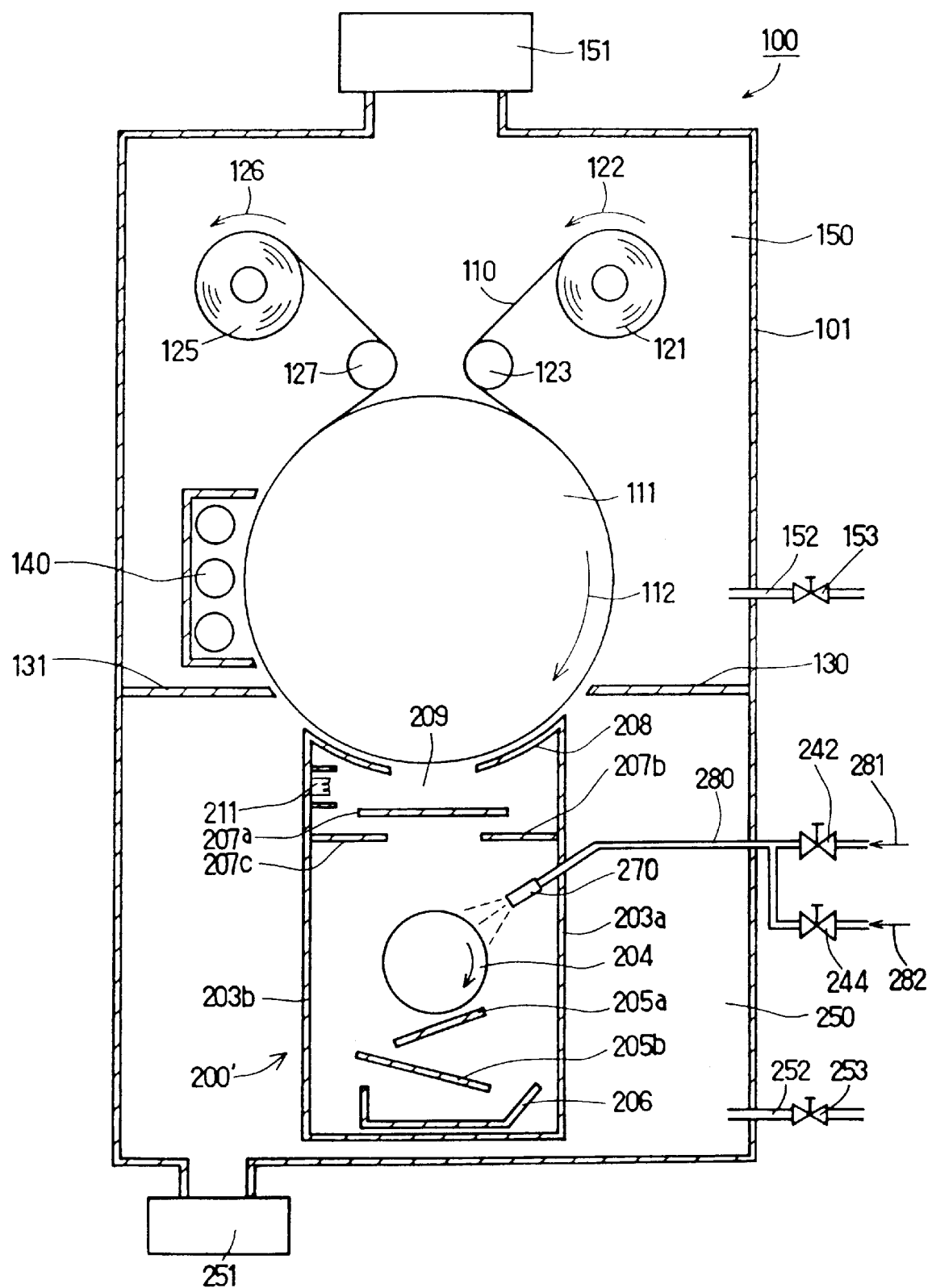
FIG. 4 is a cross-sectional drawing schematically showing an internal structure of an example of an apparatus used in a method for manufacturing a resin thin film according to Embodiment 2 of the present invention.

FIG. 4 is a cross-sectional drawing schematically showing an internal structure of another example of an apparatus used in the method of the present invention. The components having the same functions as those in FIG. 1 bear the same reference numerals, and will not be described further.

Embodiment 2 differs from Embodiment 1 in the manner in which the resin material is supplied to the heating roll 204.

In Embodiment 2, a liquid resin material 281 whose flow rate is adjusted to a predetermined flow rate by a flow rate adjusting valve 242 and a gas 282 whose flow rate is adjusted to a predetermined flow rate by a flow rate adjusting valve 244 are mixed outside the vacuum container, and the mixture is supplied to a resin thin film forming apparatus 200' through a material supply tube 280 and ejected from a nozzle 270 toward a heating roll 204. Since the inside of the resin thin film forming apparatus 200' is maintained at a predetermined vacuum, the gas mixed with the resin material ejected from the nozzle is diffused rapidly. This is accompanied by the resin material being ejected in the form of fine atomized liquid droplets.

The ratio of the resin material and the gas in the mixture is required to be adjusted in accordance with the properties of the resin material used (e.g., viscosity) or the flow rate of the resin. The dependence of the average particle diameter of the resin sprayed from the nozzle 270, the pressure in the resin thin film forming apparatus 200', the film-forming rate, and the number of defects contained in the resin thin film with respect to the gas flow rate when the resin flow rate is constant is substantially the same as that of FIG. 3, and will not be described further.

As the nozzle 270, a nozzle whose inside is formed from a straight tube is the most simple in its structure. However, when a spray nozzle is used, the resin can be sprayed in the form of finer particles. As the spray nozzle, any known spray nozzle can be used. The liquid resin material and the gas are mixed, and then the mixture is forced to be supplied to the spray nozzle.

The atomizing means of the resin material according to this embodiment has a very limited mechanical effect on the resin material, and can minimize changing the nature of the resin material or generating heat.

EMBODIMENT 3

An application example of the method for manufacturing the resin thin film of the present invention will be described by taking the manufacturing of a layered product of resin thin films and metal thin films as an example.

Figure 5:
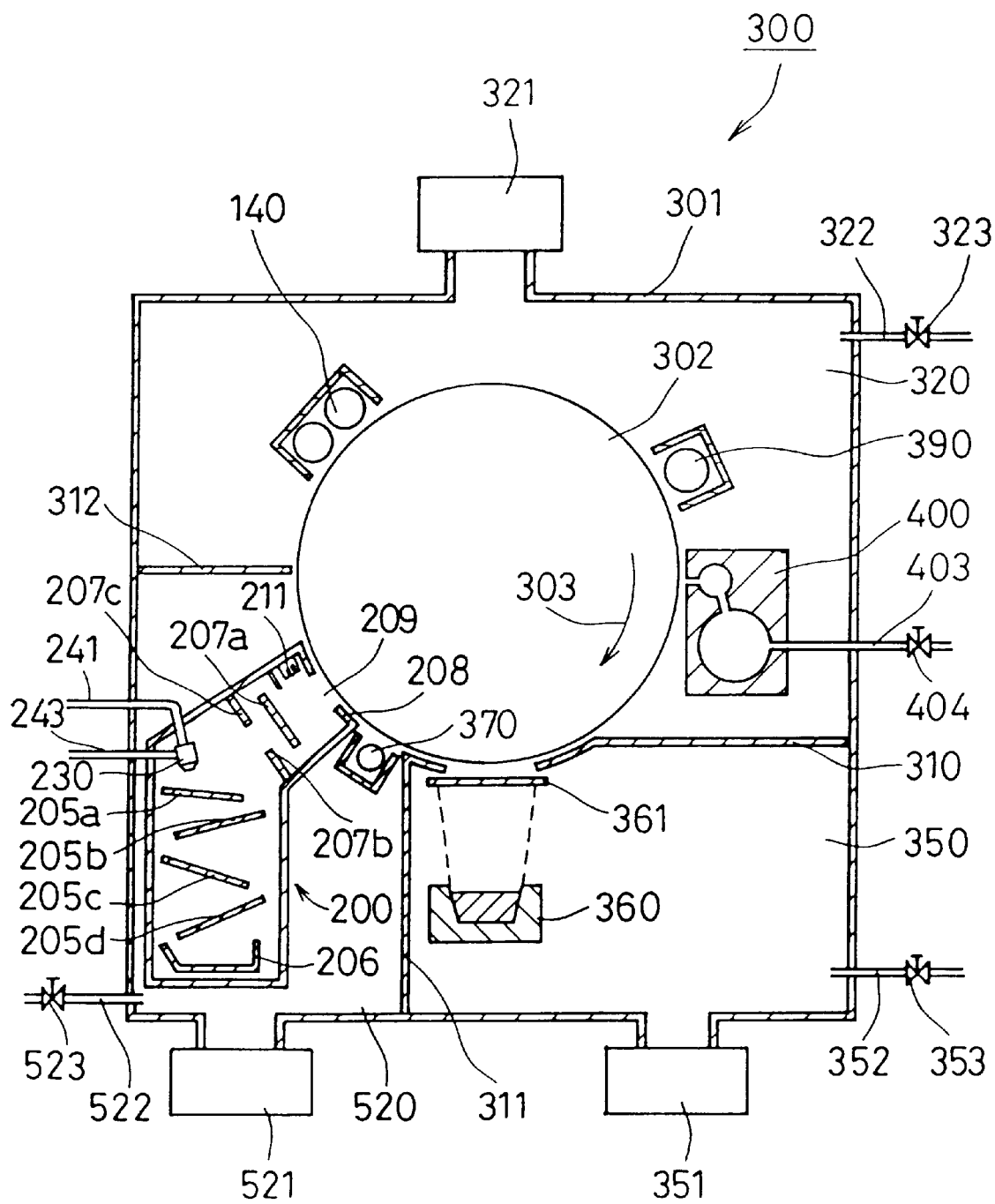
FIG. 5 is a cross-sectional drawing schematically showing an internal structure of an example of an apparatus for manufacturing a layered product including resin thin films and metal thin films according to Embodiment 3 of the present invention.

FIG. 5 is a cross-sectional drawing schematically showing an internal structure of an example of an apparatus for manufacturing a layered product including resin thin films and metal thin films. The components having the same functions as those in FIGS. 1 to 4 bear the same reference numerals, and will not be described further.

An apparatus 360 for forming a metal thin film (hereinafter, referred to as "metal thin film forming apparatus") is provided under a can roller 302, which rotates in a direction shown by arrow 303 in FIG. 5 with a constant angular velocity or circumferential velocity. A resin thin film forming apparatus 200 is provided downstream of the rotation direction of the can roller 302.

Furthermore, in this example, an apparatus 400 for applying a patterning material, which forms margins in the metal thin film (regions where the metal thin film is not formed), is provided upstream of the metal thin film forming apparatus 360. Furthermore, an apparatus 370 for removing patterning material is provided between the metal thin film forming apparatus 360 and the resin thin film forming apparatus 200. A resin curing device 140 and a device 390 for treating a resin surface are provided between the resin thin film forming apparatus 200 and the apparatus 400 for applying a patterning material. However, these apparatuses can be provided as appropriate.

These apparatuses are housed in a vacuum container 301. The vacuum container 301 is partitioned into three compartments by partition walls 310, 311 and 312, and these compartments are maintained at respective predetermined vacuum degrees. In order to maintain each of the vacuum degrees constant over time, each compartment includes a vacuum pump and a gas supply tube for supplying a gas from the outside. More specifically, a vacuum pump 321, a gas supply tube 322 and a flow rate adjusting valve 323 are provided in a compartment (a second compartment) 320 including the can roller 302. A vacuum pump 351, a gas supply tube 352 and a flow rate adjusting valve 353 are provided in a compartment (a third compartment) 350 including the metal thin film forming apparatus 360. A vacuum pump 521, a gas supply tube 522 and a flow rate adjusting valve 523 are provided in a compartment (a first compartment) 520 including the resin thin film forming apparatus 200.

The vacuum degree of each compartment may be set as appropriate. However, for example, the following vacuum degrees are preferable. The vacuum degree Pv of the compartment (the second compartment) 320 including the can roller 302 is set to $3 \times 10^{-3}$ Torr or less. The vacuum degree Pa of the compartment (the third compartment) 350 including the metal thin film forming apparatus 360 is set to $1 \times 10^{-5}$ to $1 \times 10^{-4}$ Torr. The vacuum degree Pr of the compartment (the first compartment) 520 including the resin thin film forming apparatus 200 is set to $1 \times 10^{-3}$ Torr or less. When Pv is larger than the above-described range, in the case where plasma discharge is utilized as the device 390 for treating a resin surface, plasma become unstable. When Pa is larger than the above-described range, the formed metal thin film can be degraded easily. When Pr is either larger or smaller than the above-described range, the scattering of the resin material can be unstable.

Furthermore, it is preferable that the vacuum degrees meet the relationship Pv>Pr>Pa. When the compartment 350 including the metal thin film forming apparatus has the lowest pressure, the metal to be deposited is prevented from entering other compartments. Furthermore, when the compartment 520 including the resin thin film forming apparatus 200 has a pressure lower than that of the compartment 320 including the can roller 302, the resin material is prevented from entering the compartment including the can roller 302 and adhering to the sliding portions.

The circumferential surface of the can roller 302 is smooth, preferably mirror-finished, and cooled preferably to −20° C. to 40° C., more preferably −10° C. to 10° C. The rotation velocity can be adjusted freely, but preferably about 15 to 70 rpm, and the circumferential velocity preferably is 20 to 200 m/min. In this embodiment, the can roller 302 that is a cylindrical drum is used as the supporting base, but a belt-shaped supporting base that runs between two or more rolls, a rotating disk-shaped supporting base or the like is also possible.

The resin thin film forming apparatus 200 has the same structure as that described in Embodiment 1. However, this embodiment differs from Embodiment 1 in that four heating plates 205a, 205b, 205c, and 205d are used as the heating members for evaporating the resin material.

Furthermore, in this embodiment, since the metal thin film forming apparatus 360 is provided under the can roller 302, the resin thin film forming apparatus 200 is provided to the lower left side of the can roller in FIG. 5. Therefore, this embodiment differs from Embodiment 1 in that the path of the resin material is bent and a opening plate 208 is inclined at a predetermined angle with respect to the horizontal direction, whereas the opening plate 208 is substantially in parallel to the horizontal plane in Embodiment 1.

The liquid resin material is adjusted to a predetermined flow rate and supplied to a two-fluid nozzle 230 in the resin thin film forming apparatus 200 through a resin material supply tube 241. The two-fluid nozzle 230 is the same as that described in Embodiment 1 (see FIG. 2). At the same time, a gas is supplied to the two-fluid nozzle 230 through a gas supply tube 243. As a result, the resin material is ejected in the form of atomized particles toward the heating plate 205a. The resin material that has adhered to a wide area of the heating plate 205a forms numerous fine liquid droplets or a thin liquid film, and most of them evaporate on the heating plate 205a. The resin material that has not evaporated yet evaporates while moving on the heating plates 205b, 205c, and 205d sequentially, and the resin material that still remains without being evaporated drops to a cooling cup 206. Evaporated resin material passes between barriers 207a, 207b and 207c and is charged by a charged particle beam irradiation device 211, so that the resin material adheres onto the circumferential surface of the can roller 302 through the opening 209 of the opening plate 208, so that a resin thin film is formed.

The formed resin thin film is cured to a desired curing degree by a resin curing device 140.

Then, the resin thin film is subjected to a surface treatment by a device 390 for treating a resin surface. Examples of the surface treatment include a discharge treatment and an ultraviolet ray irradiation treatment in an atmosphere containing oxygen. This treatment activates the surface of the resin thin film so as to improve adhesion with the metal thin film.

The apparatus 400 for applying a patterning material deposits a patterning material on the surface of the resin thin film in a predetermined shape. At the portions where the patterning material has been deposited, no metal thin film is formed, so that these portions become margins (insulating regions). In this embodiment, a predetermined number of strips of patterning material of a predetermined width and shape are deposited at predetermined positions in the circumferential direction on the surface of the resin thin film formed on the can roller 302.

Figure 6:
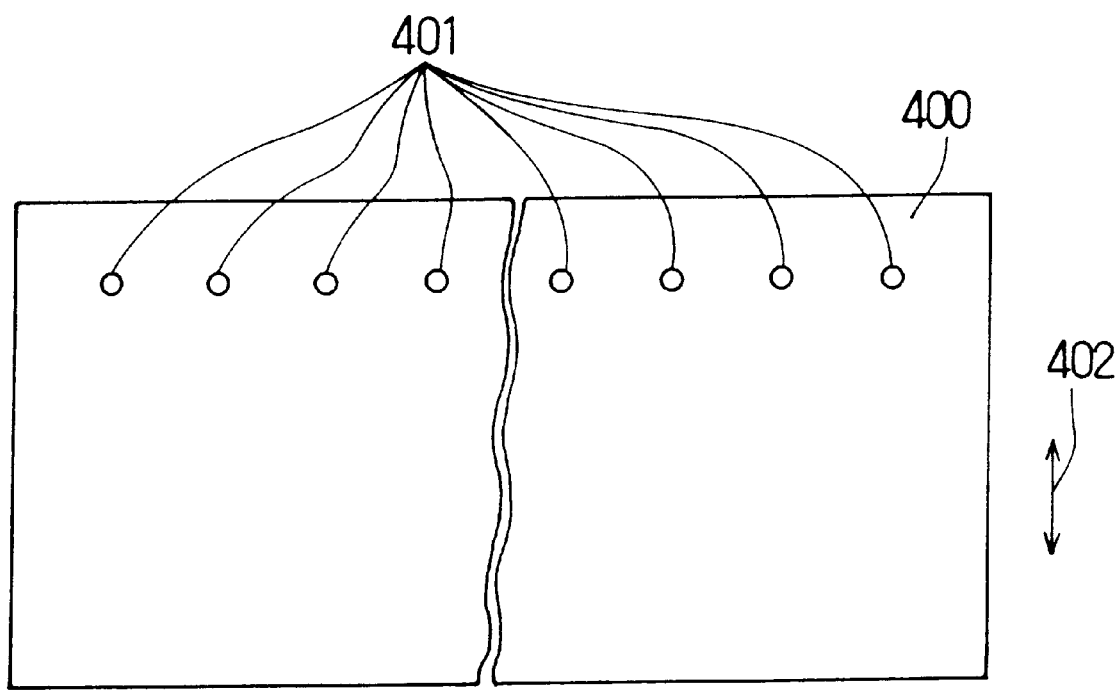
FIG. 6 is a front view of an apparatus for applying a patterning material used in the production apparatus of FIG. 5, when viewed from the side of a can roller.

FIG. 6 is a plan view of the apparatus for applying a patterning material used in the manufacturing apparatus of FIG. 5, when viewed from the side of the can roller 302.

On the front of the apparatus 400 for applying a patterning material, a predetermined number of pinholes 401 are arranged at predetermined intervals. The apparatus 400 for applying a patterning material is positioned in a manner that the pinholes 401 oppose the circumferential surface of the can roller 302, which is the deposition surface, and the direction indicated by arrow 402 matches the travel direction of the deposition surface. Then, the evaporated patterning material is ejected from the pinholes 401 so as to deposit the patterning material on the deposition surface, and condensed by cooling, whereby a deposition film of the patterning material is formed. Consequently, the intervals and the number of pinholes 401 in FIG. 6 correspond to the intervals and the numbers of strips of patterning material formed on the surface of the resin thin film.

Contactless applications of the patterning material on the surface of the resin prevent deformations of the resin thin film and the metal thin film below it, which may cause rupture of the layers or chapping of the surface.

The patterning material is pre-evaporated, and adjusted to a predetermined flow rate by a flow rate adjusting valve 404 so as to be supplied to the apparatus 400 for applying a patterning material through a line 403. In this case, the line 403 and the apparatus 400 for applying a patterning material are heated and maintained at a predetermined temperature so that the patterning material is not condensed.

It is preferable that the deposition position in the width direction of the patterning material can be changed in the process of the deposition, where appropriate. For example, the rotating can roller 302 can be designed to be moved so that the deposition position of the patterning material is moved for a predetermined amount in a plane parallel to the deposition surface of the can roller (a plane orthogonal to the normal line of the circumferential surface of the can roller) and in a direction perpendicular to the travel direction of the deposition surface (direction perpendicular to the travel direction 402 in FIG. 6, namely, the direction of the rotation axis of the can roller 302). This design provides a layered product including the resin thin films and the metal thin films laminated sequentially where the position of the margin of each layer can be changed. For example, in the case where the layered product is used as an electronic component, this design easily can realize that the metal thin films sandwiching the resin thin film are made into electrodes having different electrical potentials.

It is preferable that the patterning material comprises at least one oil of the group consisting of ester oils, glycol oils, fluorocarbon oils, and hydrocarbon oils. It is more preferable that the patterning material is an ester oil, a glycol oil, or a fluorocarbon oil. It is most preferable that the patterning material is a fluorocarbon oil.

The patterning material is required to be able to withstand the thermal load during the formation of the metal thin film, and ensure that no metal thin film is formed at the region where patterning material has been applied. In addition to that, the material is required to be applied contactless in its gaseous or liquid state on a resin thin film surface. Furthermore, the material is required not to clog the pinholes of the apparatus for applying a patterning material. The material may be required to be compatible with the resin thin film formed with the inventive method and to have a certain wettability. In some cases, the material is required to be removable by heat or decomposition in a vacuum. Since such special conditions are added, it is preferable that the patterning material used in the present invention is an oil that is especially adapted to these conditions. When materials other than the above patterning materials are used, the surface of the layered product may be chapped, pinholes may appear in the resin thin films or the metal thin films, or other problems such as unsteady deposition region of the metal thin films may occur.

The metal thin film forming apparatus 360 forms a metal thin film after the desired patterning material is deposited, if necessary. The metal thin film can be formed by vapor deposition, sputtering, ion plating or other well-known methods. For the present invention, however, vapor deposition, especially electron beam vapor deposition, is preferable, because with this method, a film with excellent moisture resistance can be obtained with high productivity. Possible materials for the metal thin film include aluminum, copper, zinc, nickel, iron, cobalt, silicon, germanium, alloys thereof, their compounds, their oxides, and the oxides of their compounds. Of these, aluminum is preferable, because of its adhesiveness and low cost. The metal thin film also can include other components.

In the apparatus of FIG. 5, a movable shielding plate 361 is provided between the metal thin film forming apparatus 360 and the can roller 302 so that only resin thin films can be formed without forming a metal thin film.

It is preferable that residual patterning material is removed after the metal thin film has been formed and before the resin thin film is deposited. Most of the patterning material that has been deposited with the apparatus for applying a patterning material is removed by being again evaporated when the metal thin film is formed. However, a portion remains even after the formation of the metal thin film, and can contribute to a number of problems, such as chapping the deposited surface, causing pinholes (lack of deposition) in the resin thin film or the metal thin film, or instabilities in the regions where the metal thin film is deposited.

The removal of the patterning material is performed by an apparatus 370 for removing patterning material, which is installed between the metal thin film forming apparatus 360 and the resin thin film forming apparatus 200. There is no particular limitation regarding how the patterning material is removed, and an appropriate method can be selected in accordance with the patterning material type. The patterning material can be removed by heat and/or decomposition, for example. Examples of how the patterning material can be removed by heat include irradiation of light or use of an electric heater. Devices for irradiation of light can be simple and remove the patterning material efficiently. Here, "light" includes far infrared and infrared rays. Examples of how the patterning material can be removed by decomposition, on the other hand, include plasma irradiation, ion irradiation, and electric beam irradiation. For the plasma irradiation, for example oxide plasmas, argon plasmas, or nitrogen plasmas can be used, and among these, oxide plasmas are especially preferable in view of decomposition ability.

Using the above-described apparatus 300, a layered product comprising resin thin films and metal thin films can be manufactured on a rotating support base 302.

The obtained layered product can be used as, for example an electronic component such as a conductor for high frequencies, a capacitor and a thin film coil, a circuit substrate, a protective film, a functional film or the like.

Hereinafter, an example of a method for manufacturing a chip capacitor will be described.

Figure 7:
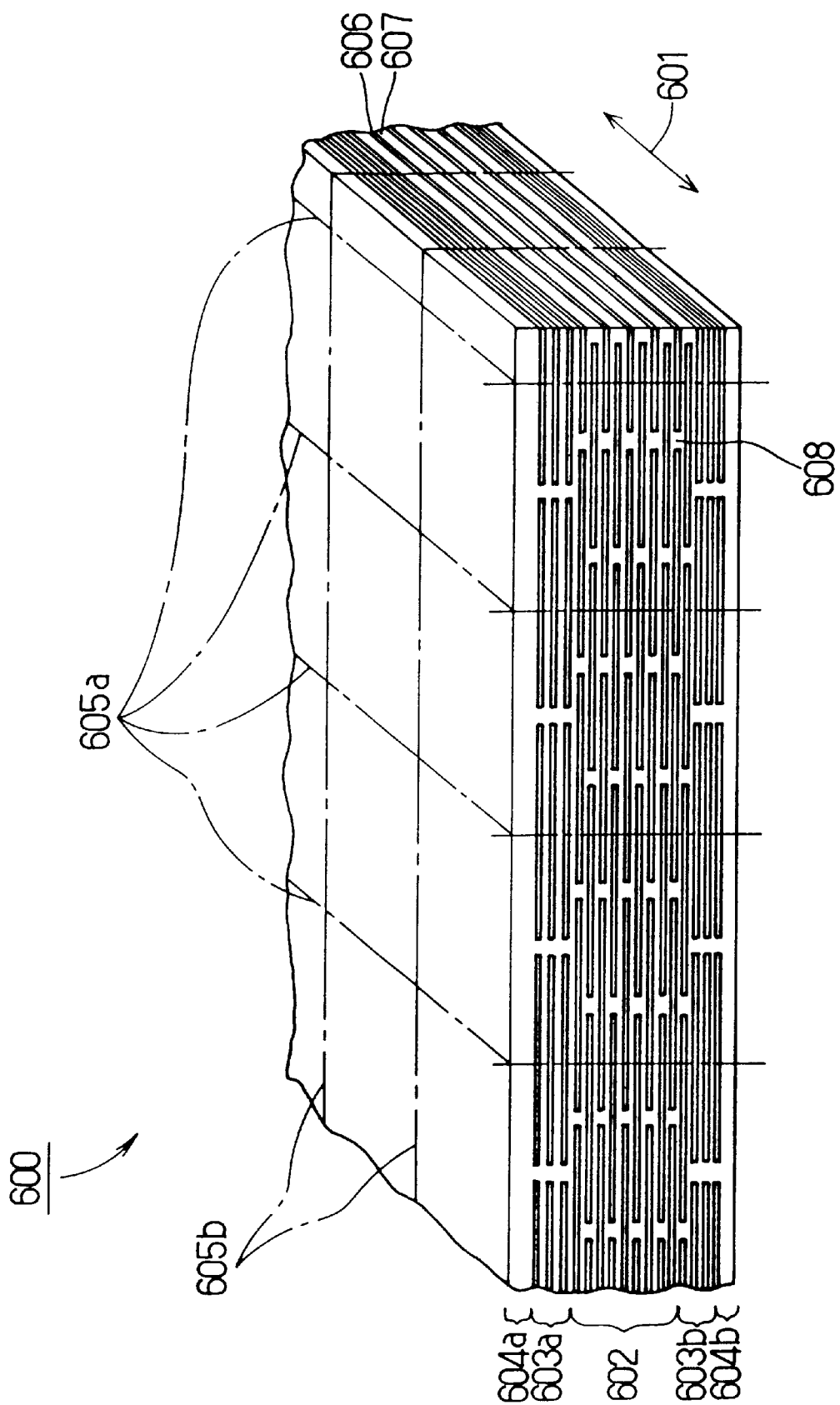
FIG. 7 is a perspective view schematically showing an example of a structure of a layered base element including resin thin films and metal thin films obtained by Embodiment 3 of the present invention.

A cylindrical multilayered product including the metal thin films and the resin thin films where margins are formed in predetermined positions is formed on the circumferential surface of the can roller 302 by the above-described method. Then, the layered product is cut into 8 segments (by every 45°) in the radial direction and removed, and pressed under heat so as to be formed into a flat shape. FIG. 7 shows a perspective view of an example of the outline of the structure of the thus obtained layered product base element 600 including the metal thin films and the resin thin films. In FIG. 7, arrow 601 indicates the travel direction of the circumferential surface of the can roller 302. The layered product base element 600 includes a protective layer 604b, a reinforcement layer 603b, an element layer 602, a reinforcing layer 603a, and a protective layer 604a, which are laminated sequentially from the side of the can roller 302 (the lower side of the sheet of the FIG. 7). In the FIG. 7, numeral 606 denotes a metal thin film, numeral 607 denotes a resin thin film, and numeral 608 denotes a margin. FIG. 7 shows a schematic deposition state, and the number of layers deposited are significantly smaller than that of an actual capacitor.

The layered product base element is cut at sectional planes 605a and brass is sprayed onto the sectional planes to form external electrodes. Furthermore, conductive paste where an alloy of copper, nickel, silver or the like is dispersed in a thermosetting phenol resin is applied to the surface of the sprayed metal and cured by heat. Then, hot solder dipping is performed on the surface of the resin. Thereafter, the layered product base element is cut at sectional planes 605b in FIG. 7 and immersed in a silane coupling agent solution so as to coat the outer surface. Thus, a chip capacitor 610 as shown in FIG. 8 is obtained.

Figure 8:
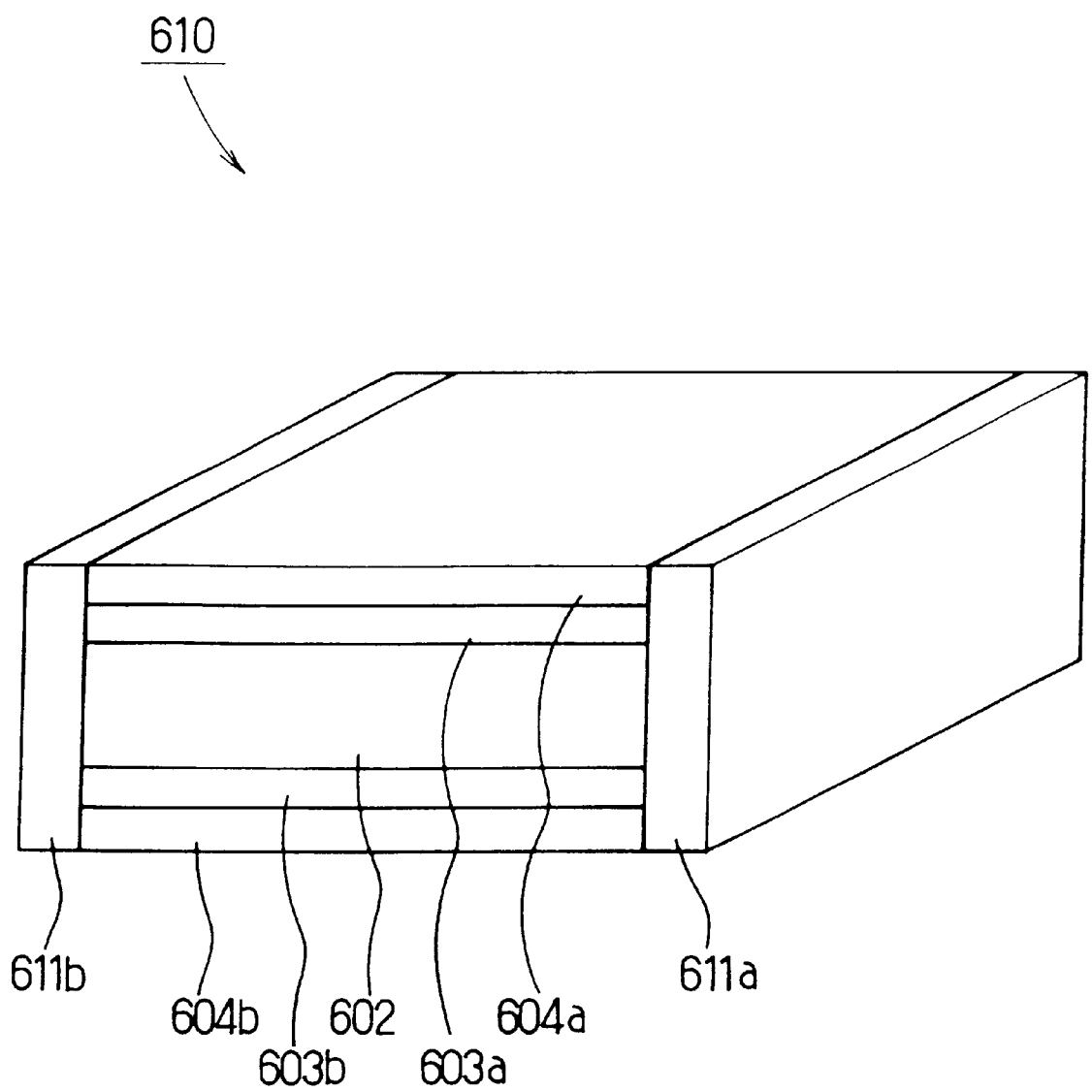
FIG. 8 is a perspective view schematically showing an example of a structure of a chip capacitor obtained by Embodiment 3 of the present invention.

Referring to FIG. 8, numerals 611a and 611b denote external electrodes, and the metal thin films of the element layer 602 are connected to the external electrodes 611a and 611b alternately. Therefore, when an electrical potential difference is applied between the external electrodes 611a and 611b, a number of capacitors including the metal thin films of the element layer 602 as electrodes and the resin thin films 607 as dielectrics are connected in parallel, and thus a compact capacitor with a large capacity can be obtained.

The reinforcement layers 603a and 603b do not generate capacitance as a capacitor, so that they are not always necessary. However, the reinforcement layers can improve the adhesion strength with the external electrodes by connecting the metal thin films of the reinforcement layers to the external electrodes. Furthermore, the reinforcement layers 603a and 603b serve to protect the element layer 602 from external force or heat together with the protective layers 604a and 604b, which are formed by laminating the resin thin films alone.

In the present invention, there is no particular limitation regarding the thickness of the resin thin film, but a thickness of not more than 1 $\mu$m is preferable, a thickness of not more than 0.7 $\mu$m is more preferable, and a thickness of not more than 0.4 $\mu$m is most preferable. To full the need for a layered product that is small yet achieves high performance, it is preferable that the thickness of the resin thin film of the layered product obtained with the inventive method is small. For example, if the layered product obtained with the inventive manufacturing method is used as a chip capacitor as described above, the capacitance of the capacitor increases in inverse proportion to the thickness of the resin thin film, which serves as a dielectric layer.

The surface roughness of the resin thin film preferably is not more than 0.1 $\mu$m, more preferably not more than 0.04 $\mu$m, and most preferably not more than 0.02 $\mu$m, although it can be selected as appropriate depending on the use of the resin thin film. For the metal thin film, a surface roughness of not more than 0.1 $\mu$m is preferable, a surface roughness of not more than 0.04 $\mu$m is more preferable, and a surface roughness of not more than 0.02 $\mu$m is most preferable. If the surface roughness is larger, no improvement of characteristics of the resultant layered product can be achieved for various applications, and its characteristics become unstable. For example, when applied to a magnetic recording medium, high-density recording becomes difficult, large surface protrusions cause dropout, and the reliability of the recording decreases. When applied to electronic components, high-density integration becomes difficult, an electric field is concentrated on large surface protrusions, and the resin thin film may be leached or the metal thin film may be burnt.

In this specification, "surface roughness" refers to the ten point average roughness Ra, measured with a contact-type surface meter having a diamond needle of 10 $\mu$m tip diameter and a 10 $\mu$g measuring load. To measure the surface roughness of a resin thin film, the needle is contacted directly with the resin thin film surface, and to measure the surface roughness of a metal thin film, the needle is contacted directly with the metal thin film surface. The measurements is required to be performed while eliminating the influence of all other layered portions (for example, steps due to margins).

In this embodiment, the two-fluid nozzle 230 described in Embodiment 1 is used as the atomizing means of the resin material. However, the atomizing means using the nozzle 270 described in Embodiment 2 also can be used instead.

EXAMPLES

Hereinafter, the present invention will be described more specifically.

Example 1

A resin thin film was formed with the apparatus of FIG. 1 according to the method shown in Embodiment 1.

An Al vapor-deposited polyester film was used as the supporting base. This polyester film was transported on a can roller 111 of a diameter of 500mm whose circumferential surface had been cooled to 5° C. The travel rate was 50 m/min.

The upper compartment 150 in the vacuum container 101 was maintained at $5 \times 10^{-4}$ Torr by the vacuum pump 151. The lower compartment 250 including the resin thin film forming apparatus 200 was maintained at $2 \times 10^{-4}$ Torr by the vacuum pump 251.

As the resin thin film material, dicyclopentadiene dimethanol diacrylate was used. The resin material was preheated to 60° C. and supplied to the two-fluid nozzle 230 through the resin supply tube 241 at a flow rate of 5 cc/min. At the same time, nitrogen was supplied to the two-fluid nozzle 230 through the gas supply tube 243 at a flow rate of 3 cc/min. The resin material ejected from the outlet of the two-fluid nozzle 230 in the form of atomized particles was evaporated on the heating roll and the heating plates, charged with electrostatic charges by the device 211 for irradiating a charged particle beam (electron beam irradiation device). Then, the resin material was deposited on the supporting base. The amount of the resin material supplied and the pressure of the gas were adjusted so as to obtain the desired thickness of the resin thin film.

Thereafter, the formed resin thin film was cured by the ultraviolet ray irradiation device 140 until the curing degree reached 70%.

In this manner, the resin thin film was formed until the length of the supporting base reached 10000 m. The thickness of the resin thin film formed on the supporting base was measured at 10 points by every 1000 m, and the average thickness and the variation (the difference between the largest value and the smallest value) were obtained. The thickness of the resin thin film was measured in the following method. A portion of the resin thin film was adhered to a cellophane tape, and peeled and removed. Then, platinum palladium 5 nm thick was formed on the removed surface and a step formed by the difference between the presence and the absence of the resin thin film was measured with an SEM electron microscope. The measured step was defined as the thickness of the resin thin film.

The results were that the average thickness of the obtained resin thin films was 0.4 μm and the variation of the thickness was 0.02 μm.

Furthermore, when the surface of the formed resin thin film was observed closely, the surface was uniform and no large protrusions were seen.

Example 2

A resin thin film was formed with the apparatus of FIG. 4 according to the method shown in Embodiment 2.

The same resin thin film material and gas as those in Example 1were used. The resin material at a flow rate of 5 cc/min and the gas at a flow rate of 3 cc/min were mixed and ejected in the form of atomized particles through the nozzle 270. The amount of the mixture supplied of the resin material and the gas were adjusted so as to obtain the desired thickness of the resin thin film.

The resin thin film was formed in the same manner as in Example 1except for the above-described conditions, and the thickness of the resin thin film was measured in the same manner as in Example 1, and the surface state was observed.

The results were that the average thickness of the obtained resin thin films was 0.4 μm and the variation of the thickness was 0.03 μm.

Furthermore, when the surface of the formed resin thin film was observed closely, the surface was uniform and no large protrusions were seen.

Comparative Example 1

A resin thin film was formed on a supporting base in the same manner as in Example 1 except that a liquid resin material was atomized with an ultrasonic transducer.

Figure 9:
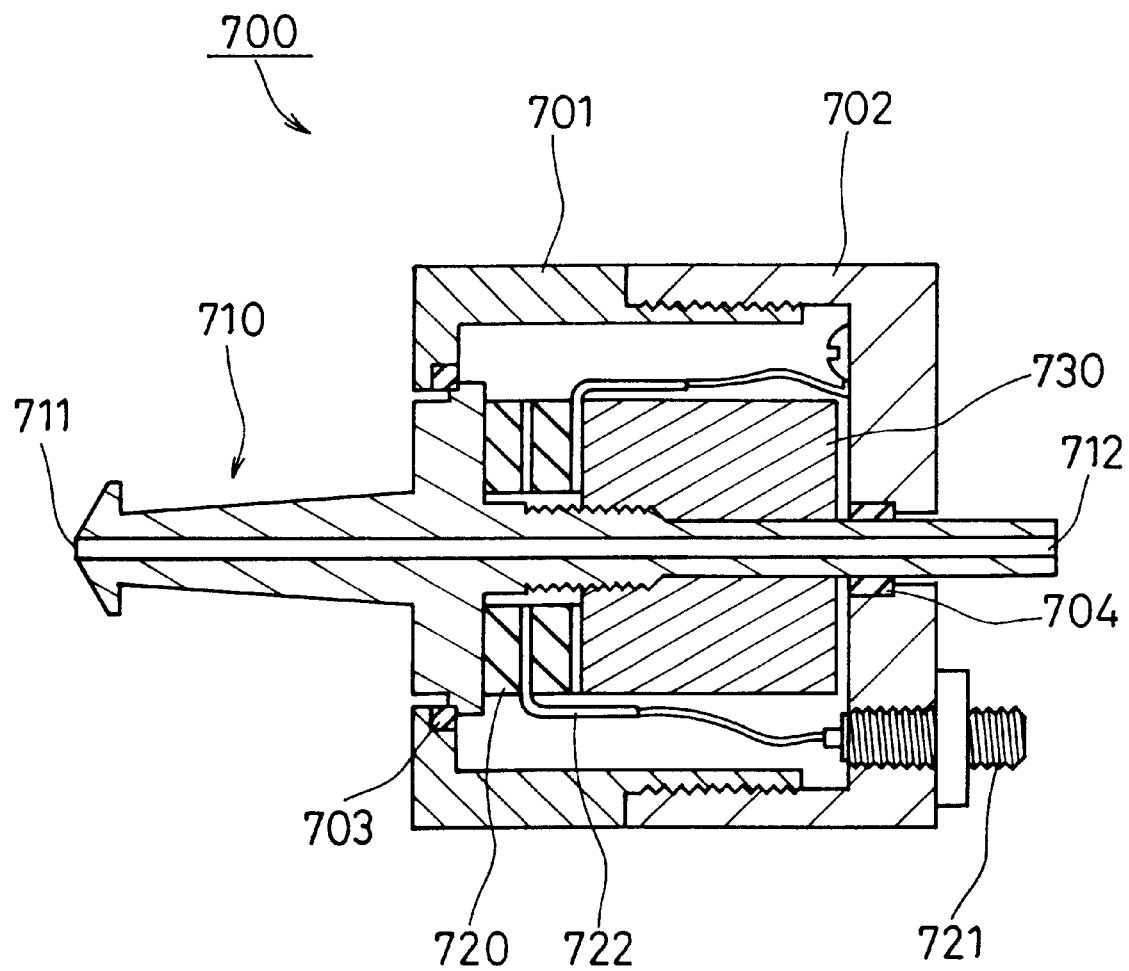
FIG. 9 is a cross-sectional drawing schematically showing an internal structure of the ultrasonic atomizer used in Comparative Example 1.

FIG. 9 shows a cross-sectional structure of an ultrasonic atomizer used. The ultrasonic atomizer 700 includes a front case 701 and a rear case 702, which are coupled into one unit, an atomizing nozzle 710 formed of titanium, a ceramic piezoelectric element 720, and a balancer 730. The atomizing nozzle 710, the ceramic piezoelectric element 720, and the balancer 730 are coupled into one unit as shown in FIG. 9 and held by the front case 701 and the rear case 702 via elastic supporting members 703 and 704. An input terminal 721 that is electrically connected to an electrode 722 is provided in the rear case 702, and a predetermined high frequency voltage is applied to the input terminal 721. Thus, the piezoelectric element 720 vibrates while expanding and contracting in the horizontal direction of the sheet of FIG. 9 at a predetermined frequency. The vibration of the piezoelectric element 720 causes the atomizing nozzle 710 and the balancer 730 to vibrate in the horizontal direction of the sheet, whereas they have opposite displacement directions. The mass of the balancer 730 is adjusted so that the amplitude of an atomizing surface 711 at the end of the atomizing nozzle 710 becomes largest. The liquid resin material is supplied from a port 712 provided at one end of the atomizing nozzle 710. The supplied resin material passes through the atomizing nozzle 710 so as to be ejected in the form of atomized particles from an opening on the atomizing surface 711.

The piezoelectric element was oscillated at 120 kHz, and the resin was supplied from the port 712 at 5 cc/min, and the resin was atomized at the atomizing surface 711. Here, no gas is necessary for atomization, so that the gas supply tube 243 is not connected to the ultrasonic atomizer 700. The direction in which the atomized resin was ejected and the method for evaporating the resin were the same as those in Example 1.

The resin thin film was formed in the same manner as in Example 1except for the above-described conditions, and the thickness of the resin thin film was measured in the same manner as in Example 1, and the surface state was observed.

The results were that the average thickness of the obtained resin thin films was 0.4 μm and the variation of the thickness was 0.15 μm.

Furthermore, when the surface of the formed resin thin film was observed closely, a large number of large protrusions caused by large particles were seen, and the film was discontinuous in some parts.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

The method for manufacturing a resin thin film of the present invention can provide a resin thin film having a very small and uniform thickness and high quality that can be manufactured at low cost. The resin thin film obtained by the present invention can be used in a wide range of applications for which a conventional resin thin film is used, such as a magnetic recording medium such as a magnetic tape, a wrapping paper, and an electronic component. In particular, the resin thin film obtained by the present invention having such characteristics as described above can be used in an electronic component preferably. For example, when the resin thin film is used in a capacitor, especially a chip capacitor, a compact and high capacity capacitor with stable quality can be obtained inexpensively. Moreover, when it is utilized in the manufacture of an electronic component such as a chip coil, a noise filter, a chip resister or the like, a compact, high performance and cost-efficient electronic component can be achieved.

What is claimed is:

1. A method for manufacturing a resin thin film by depositing an evaporated resin material on a surface of a supporting base, comprising:
   supplying a liquid resin material and a gas to a two-fluid nozzle by pressure;
   ejecting the resin material in a form of atomized particles toward a heating member by the two-fluid nozzle, thereby adhering the resin material to the heating member; and
   evaporating the resin material on the heating member to obtain the evaporated resin material.

2. The method according to claim 1, wherein a surface roughness of the resin thin film is not more than 0.1 $\mu$m.

3. The method according to claim 1, wherein the gas comprises at least one selected from the group consisting of nitrogen, oxygen, argon, helium, and neon.

4. The method according to claim 1, wherein a flow rate of the gas is 10 to 200% of a flow rate of the liquid resin material.

5. The method according to claim 1, wherein the heating member is at least one selected from the group consisting of a heating plate, a rotating heating drum, and a rotating heating belt.

6. The method according to claim 5, wherein a shape formed by the resin material being ejected in the form of atomized particles is a fan shape.

7. The method according to claim 1, wherein the heating member is a cone or a cone-shaped heating plate.

8. The method according to claim 7, wherein a shape formed by the resin material being ejected in the form of atomized particles is a solid cone.

9. The method according to claim 7, wherein a shape formed by the resin material being ejected in the form of atomized particles is a hollow cone.

10. The method according to claim 1, wherein a thickness of the resin thin film is not more than 0.7 $\mu$m.

11. The method according to claim 1, wherein the resin material is a reactive monomer resin.

12. The method according to claim 1, wherein the liquid resin material is heated before being ejected in the form of atomized particles.

13. The method according to claim 1, wherein a region where the resin material is ejected in the form of atomized particles is not in straight communication with a region of the supporting base where the resin material is deposited.

14. The method according to claim 1, wherein a region of the heating member where the resin material is evaporated is not in straight communication with a region of the supporting base where the resin material is deposited.

15. The method according to claim 1, wherein the evaporated resin material reaches a deposition region of the supporting base by passing between barriers that are provided so as to be apart by a predetermined distance and to form an opposing portion.

16. The method according to claim 1, wherein the evaporated resin material is charged.

17. The method according to claim 1, wherein the resin thin film is manufactured in a vacuum.

18. The method according to claim 1, wherein the resin thin film is formed on a surface of the supporting base continuously by moving the supporting base.

19. The method according to claim 1, wherein the resin thin films are laminated on the supporting base by rotating the supporting base.

20. The method according to claim 1, wherein after being deposited, the resin material is cured.

21. The method according to claim 20, wherein the resin material is cured by at least one of the processes selected from the group consisting of polymerization and cross-linking.

22. The method according to claim 20, wherein the resin material is cured until a curing degree of the resin material reaches 50 to 95%.

23. The method according to claim 1, wherein after the resin thin film is formed, a surface of the resin thin film is treated.

24. The method according to claim 23, wherein the surface of the resin thin film is treated by at least one of the treatments selected from the group consisting of a discharge treatment and an ultraviolet ray irradiation treatment in an atmosphere containing oxygen.

25. The method according to claim 1, wherein a thickness of the resin thin film is not more than 1 $\mu$m.

26. The method according to claim 1, wherein after the resin thin film is formed, a metal thin film is laminated thereon.

27. The method according to claim 26, wherein before depositing the metal thin film, a patterning material is deposited on a surface of the resin thin film.

28. The method according to claim 26, wherein the metal thin film is deposited by vapor deposition.

29. The method according to claim 26, wherein the resin thin films and the metal thin films are laminated alternately on the supporting base by rotating the supporting base.

30. A method for manufacturing a resin thin film by depositing an evaporated resin material on a surface of a supporting base, comprising:
   mixing a liquid resin material with a gas;
   ejecting the resin material in a form of atomized particles toward a heating member that is provided under a reduced pressure, thereby adhering the resin material to the heating member; and
   evaporating the resin material on the heating member to obtain the evaporated resin material.

31. The method according to claim 30, wherein after the liquid resin material and the gas are mixed, the mixture is forced to be supplied to a spray nozzle, and the resin material is ejected in the form of atomized particles.

32. The method according to claim 30, wherein the gas comprises at least one selected from the group consisting of nitrogen, oxygen, argon, helium, and neon.

33. The method according to claim 30, wherein a flow rate of the gas is 10 to 200% of a flow rate of the liquid resin material.

34. The method according to claim 30, wherein the heating member is at least one selected from the group consisting of a heating plate, a rotating heating drum, and a rotating heating belt.

35. The method according to claim 30, wherein the heating member is a cone or a cone-shaped heating plate.

36. The method according to claim 30, wherein the resin material is a reactive monomer resin.

37. The method according to claim 30, wherein the liquid resin material is heated before being ejected in the form of atomized particles.

38. The method according to claim 30, wherein a region where the resin material is ejected in the form of atomized particles is not in straight communication with a region of the supporting base where the resin material is deposited.

39. The method according to claim 30, wherein a region of the heating member where the resin material is evaporated is not in straight communication with a region of the supporting base where the resin material is deposited.

40. The method according to claim 30, wherein the evaporated resin material reaches a deposition region of the supporting base by passing between barriers that are provided so as to be apart by a predetermined distance and to form an opposing portion.

41. The method according to claim 30, wherein the evaporated resin material is charged.

42. The method according to claim 30, wherein the resin thin film is manufactured in a vacuum.

43. The method according to claim 30, wherein the resin thin film is formed on a surface of the supporting base continuously by moving the supporting base.

44. The method according to claim 30, wherein the resin thin films are laminated on the supporting base by rotating the supporting base.

45. The method according to claim 30, wherein after being deposited, the resin material is cured.

46. The method according to claim 30, wherein after the resin thin film is formed, a surface of the resin thin film is treated.

47. The method according to claim 30, wherein a thickness of the resin thin film is not more than 1 $\mu$m.

48. The method according to claim 30, wherein a thickness of the resin thin film is not more than 0.7 $\mu$m.

49. The method according to claim 30, wherein a surface roughness of the resin thin film is not more than 0.1 $\mu$m.

50. The method according to claim 30, wherein after the resin thin film is formed, a metal thin film is laminated thereon.

* * * * *